United States Patent [19]

Sasagawa et al.

[11] Patent Number: 6,056,989
[45] Date of Patent: *May 2, 2000

[54] PH ADJUSTORS AND DRINKS USING THE SAME

[75] Inventors: Michiko Sasagawa; Takeshi Itoh; Hiroyuki Tohira, all of Kanagawa, Japan

[73] Assignee: Japan Tobacco, Inc., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/624,621

[22] PCT Filed: Aug. 25, 1995

[86] PCT No.: PCT/JP95/01686

§ 371 Date: Apr. 25, 1996

§ 102(e) Date: Apr. 25, 1996

[87] PCT Pub. No.: WO96/06539

PCT Pub. Date: Mar. 7, 1996

[30] Foreign Application Priority Data

Aug. 26, 1994 [JP] Japan .................................. 6-202606

[51] Int. Cl.[7] .................................................... A23L 2/52
[52] U.S. Cl. ........................... 426/590; 426/74; 426/594; 426/650; 426/654; 426/655
[58] Field of Search ................................... 426/590, 599, 426/650, 654, 594, 655, 74

[56] References Cited

U.S. PATENT DOCUMENTS

| | | |
|---|---|---|
| 3,608,836 | 9/1971 | Bryant ........................................ 241/16 |
| 4,303,692 | 12/1981 | Gaull ........................................ 426/580 |
| 4,780,342 | 10/1988 | LeBlanc, Jr. ........................ 427/443.1 |
| 5,202,145 | 4/1993 | Wisler et al. ............................ 426/580 |
| 5,260,085 | 11/1993 | Wisler et al. ............................ 426/584 |
| 5,306,511 | 4/1994 | Whang ...................................... 426/66 |
| 5,725,807 | 3/1998 | Thorn et al. ............................. 252/510 |

FOREIGN PATENT DOCUMENTS

| | | |
|---|---|---|
| 0 507 157 A1 | 10/1992 | European Pat. Off. . |
| 27-5438 | 12/1952 | Japan . |
| 47-16696 | 9/1972 | Japan . |
| 60-196176 | 10/1985 | Japan . |
| 62-44137 | 2/1987 | Japan . |
| 1-291774 | 11/1989 | Japan . |
| 5-176677 | 7/1993 | Japan . |
| 5-344873 | 12/1993 | Japan . |
| 7-75791 | 3/1995 | Japan . |
| 7-504330 | 5/1995 | Japan . |
| 7-184546 | 7/1995 | Japan . |
| WO 93/17590 | 9/1993 | WIPO . |

*Primary Examiner*—Stanley S. Silverman
*Assistant Examiner*—José A. Fortuna
*Attorney, Agent, or Firm*—Birch, Stewart, Kolasch & Birch,LLP

[57] ABSTRACT

A pH adjustor for drinks comprising a potassium salt as an active ingredient wherein said potassium salt comprises an effective amount for adjusting pH of at least two members selected from the group consisting of potassium carbonate, dipotassium hydrogenphosphate and potassium hydroxide, whereby the pH adjustor is capable of suppressing the deterioration of aroma and/or taste due to lowering of pH by retort sterilization.

11 Claims, 5 Drawing Sheets

PH ADJUSTORS AND DRINKS USING THE SAME

This Application is a 371 of PCT/JP95/01686, filed on Aug. 25, 1995.

FIELD OF THE INVENTION

The invention relates to pH adjustors for drinks comprising a potassium salt as an active ingredient and to drinks using the pH adjustors.

BACKGROUND OF THE INVENTION

There are many species of coffees having different aromas and tastes (e.g., sweetness, mellowness, bitterness, body and acidity) and they range from low-grades represented by low-priced robustas to high-grades represented by high-priced arabicas. People select and drink one or more kinds of coffee according to their preference.

There are also many species of other drinks such as tea, ptisan and oolong tea and people drink one or more kinds of these drinks according to their preference.

In general, soft drinks which are prepared from coffee beans and various kinds of tea leaves are usually manufactured by extraction from raw materials, dilution, dissolution, blending and packaging, followed by heat sterilization at 100° C. or higher for maintaining a commercially acceptable aseptic condition.

Although the pH of soft drinks is generally not lower than 4.6, their ingredients will undergo pH drop during heat sterilization. As a result, the soft drinks have an undesirable acid taste and incur significant deterioration of aroma and taste in the course of time. Hence, it is essential to adjust the pH of soft drinks.

Particularly in the case of drinks containing a dairy product such as coffee and tea with milk, otherwise stably dispersed lactoproteins are aggregated at a pH below 6 to produce a precipitate. To prevent this problem, it is necessary to adjust the pH of those drinks.

For the purpose of preventing the undesirable acid taste, deterioration of aroma and taste with time or precipitation of a dairy product, the pH adjustment of soft drinks has been conducted using sodium bicarbonate (sodium hydrogencarbonate), disodium hydrogenphosphate or the like.

However, the use of sodium salts such as sodium bicarbonate, disodium hydrogenphosphate and the like for pH adjustment causes saltiness, sliminess and a bad aftertaste in drinks, which result in the deterioration of their characteristic aromas and tastes. It is believed that such deterioration in the aroma and taste of drinks is caused by the change in the aroma and taste balance due to the increase in the sodium ion concentration which occurs after addition of an excess amount of sodium salts to drinks which are prepared from coffee beans and various tea leaves that contain only a very small amount of the sodium ingredient.

Therefore, there is strongly desired the development of pH adjustors which can adjust drinks to a desired pH without deteriorating their aroma and taste. The development of such pH adjustors has very great industrial significance.

SUMMARY OF THE INVENTION

An object of the invention is to provide pH adjustors that can adjust drinks to a desired pH without deteriorating their aroma and taste and which are applicable to drinks in general, as well as drinks which are prepared by using the pH adjustors.

As a result of the study conducted on inorganic compound ingredients contained in coffee beans and various tea leaves to solve the aforementioned problem, the inventors found that a potassium ingredient which is present in a relatively large amount in various raw materials has a pH adjusting capability and maintains a aroma and taste balance and that the use of a potassium ingredient for drinks is optimal for adjusting their pH and maintaining their aroma and taste. The invention has been accomplished on the basis of these findings.

The invention provides pH adjustors for drinks comprising a potassium salt as an active ingredient.

The potassium salt includes at least one member selected from among potassium carbonate, dipotassium hydrogenphosphate, potassium dihydrogenphosphate, tripotassium phosphate, potassium hydroxide, potassium lactate, potassium tartrate, potassium succinate, potassium malate, potassium citrate and potassium fumarate. At least one member selected from among potassium carbonate, dipotassium hydrogenphosphate and potassium hydroxide is preferably used. The composition ratio of these preferred potassium salts is in the range of 10–100% by weight of potassium carbonate and 90–0% by weight of dipotassium hydrogenphosphate and/or potassium hydroxide. The potassium salt may be combined with a sodium salt.

The invention also provides drinks which are prepared by using the pH adjustors.

The drinks include those prepared from plant extracts such as coffee drinks.

The invention will now be explained in detail.

The pH of drinks may be explained physicochemically as follows: proteins, carbohydrates, fats, inorganic compounds or low-molecular weight organic compounds are dissolved or dispersed in drinks and charged chemical species maintain ionic equilibrium with one another to control the hydrogen ion concentration of the drinks.

In general, the pH of a solution can be adjusted to a desired value by using a lower concentration of a strong acid or base than in the case where a weak acid or base is to be used. Particularly in the case where the pH of drinks is to be adjusted, pH adjustors which function without deteriorating the aroma and taste of drinks are preferred.

As a result of the study of ionic species contained in drinks, the inventors found that inorganic ions such as sodium, potassium, calcium, carbonate and phosphate ions were present in raw materials for various drinks. Secondly, they attempted to adjust the pH of various drinks with commonly used sodium salts such as sodium bicarbonate and the invention's potassium salts and conducted various studies.

The results show that pH adjustors comprising a potassium salt as an active ingredient are suitable for adjusting the pH of various drinks to a desired value without deteriorating their aroma and taste. The invention has been accomplished on the basis of these results.

As described above, the use of sodium salts such as sodium bicarbonate and the like causes a saltiness, sliminess and a bad aftertaste in drinks, and this results in the deterioration of their inherent aroma and taste. In contrast, the use of potassium salts exhibits a very advantageous effect in that the inherent aroma and taste of drinks are not deteriorated.

In addition to such properties of inorganic salts, the content of inorganic salts contained in raw materials for various drinks influences the aroma and taste of the drinks during pH adjustment. For example, in the case where only a very small amount of the sodium ingredient is present in raw materials for drinks, the addition of an excess amount of sodium bicarbonate as a pH adjustor increases the sodium ion concentration and the aroma and taste balance of the drinks is thereby changed to deteriorate the aroma and taste of the drinks.

In contrast, drinks which are prepared from plant extracts contain a relatively large amount of potassium ion, so the use of pH adjustors comprising potassium salts is suitable for the purpose. Hence, the pH adjustors of the invention are more preferred for use in drinks which are prepared from plant extracts.

The pH adjustors of the invention will now be explained.

The potassium salts used in the pH adjustors of the invention are not limited to any particular types as long as they are water-soluble salts that require inorganic or organic compounds as counter chemical species. Preferred are salts that present no problems in terms of general use, safety and health because they are to be used for drinks. For example, the potassium salts include potassium carbonate, dipotassium hydrogenphosphate, potassium dihydrogenphosphate, tripotassium phosphate, potassium hydroxide, potassium lactate, potassium tartrate, potassium succinate, potassium malate, potassium citrate, potassium fumarate and the like.

Potassium carbonate, dipotassium hydrogenphosphate and potassium hydroxide are preferably used because they maintain their effect for a long period without deteriorating the aroma and taste, quality and the like of drinks.

For effectively using the pH adjustors of the invention in an especially preferred manner, it is necessary to consider the effect of potassium carbonate, dipotassium hydrogenphosphate and potassium hydroxide, taken either alone or in combination with themselves, on specific kinds of drinks selected. This is because the effects of potassium salts cannot be expected straightforwardly from the effect of a single salt and there exists a composition ratio of potassium salts which exhibits a remarkably advantageous effect as a potassium salt mixture.

Hence, it is preferred to use potassium salts at a preferable composition ratio at which the aroma and taste, quality and the like of drinks will not deteriorate, the effect is maintained for a long period, and no undesirable character is given to the drinks which is detectable as an organoleptic measure.

Specifically, pH adjustors especially intended for adjusting the pH of coffee drinks exhibit a very excellent effect if the composition ratio of the potassium salts is in the range of 10–100% by weight of potassium carbonate and 90–0% by weight of dipotassium hydrogenphosphate and/or potassium hydroxide. If the composition ratio of dipotassium hydrogenphosphate and/or potassium hydroxide is higher than 90% by weight or if that of potassium carbonate is lower than 10% by weight, the aroma and taste of drinks are maintained but a rough taste and a rough feel are slightly produced.

The drinks to which the pH adjustors of the invention are applicable will now be explained.

The pH adjustors of the invention can be applied to any kinds of drinks. Specific examples of the drinks include dairy drinks such as milk, yoghurt and the like, alcohol drinks such as beer, whisky, sake and the like, tea leaf drinks such as tea, green tea and the like, drinks prepared from roasted beans and grains such as ptisan and coffee and the like, drinks processed by decoction, fermentation or the like of medicinal animals or plants, juices and soft drinks which contain sweetening agents, drinks which contain coloring agents, flavors or combinations thereof, or combinations thereof with carbonic acid, edible jellies formed with these drinks, and the like.

In the invention, drinks which are prepared from plant extracts containing relatively large amounts of potassium ingredients are preferred. Specific examples of the preferred drinks include green tea, toasted tea, oolong tea, various medicinal teas, hot water seasoned with tang, hot water seasoned with tang and a pickled ume smell, tea, ptisan, coffee, herb tea and hydrangea tea and the like. Coffee, tea and ptisan are especially preferred.

The pH adjustors of the invention can be used in the form of powders, granules or aggregates of solid potassium salts, or solutions of potassium salts, depending on the kinds of drinks to be treated. The potassium salts can be combined with other ingredients, for example, sodium salts such as sodium bicarbonate, sodium hydroxide and the like.

The pH adjustors of the invention in a solid form can be prepared by mixing homogeneously powders of one or more potassium salts in a desired amount or by tableting a unit of the mixture in a desired amount. The pH adjustors of the invention in the form of an aqueous solution can be prepared by dissolving a desired amount of a potassium salt in water to prepare an aqueous solution of the potassium salt at a desired concentration or by dissolving desired amounts of two or more potassium salts in water to prepare an aqueous solution of the mixture. The pH adjustors of the invention can be used in amounts ranging from 0.2 to 3.2 g, preferably from 0.2 to 2.0 g per kg of the composition in the case where a mixture of potassium salts (potassium carbonate, dipotassium hydrogenphosphate and potassium hydroxide) is added to coffee with milk. The range of 0.1–0.2 g per kg of the composition is preferred in the case where the mixture is added to tea with milk or ptisan.

The pH adjustors of the invention can be used in any step of preparing various drinks. For example, the pH adjustors can be added to a raw material or an extract from a raw material. Alternatively, they can be added in a filtration, cooling, blending, heating or sterilization step, or in the step of packaging the drink in a can.

The drinks of the invention will now be explained.

The drinks of the invention are prepared by using the aforementioned pH adjustors. The kinds of the drinks are already described above. The method of preparing the drinks of the invention will be explained below taking a coffee drink as an example.

A coffee extract is easily prepared by treating roasted and ground coffee beans with hot water and filtering the percolate. The coffee extract usually has a pH value of 4–6, depending on the degree of roasting, percolation conditions and the like. The pH adjustor of the invention in the form of a powder or an aqueous solution of potassium salt at a desired concentration is added to the coffee extract and the mixture solution is thoroughly stirred. Desired amounts of sugar, milk, etc. are added to the mixture solution. The resulting solution is stirred and then packed in a container (e.g., metal can), and sterilized in a retort to prepare canned coffee with milk.

For examining the effect of the pH adjustors of the invention, the coffee drink which was prepared using the pH adjustor is stored for one week at room temperature and then tasted for organoleptic tests. Canned coffee with milk which was prepared in the same manner with the exception of using sodium bicarbonate as a pH adjustor is used as a control.

Surprisingly, the coffee with milk which was prepared using the pH adjustor of the invention had no saltiness or sliminess but exhibited a good aftertaste, thus presenting excellent aroma and taste, compared to the control which was prepared using conventional sodium bicarbonate, as described below in the Examples.

The pH adjustors of the invention can also be used to prepare canned tea and ptisan drinks. The process of preparing these drinks is basically the same as in the case of coffee drinks except that tea leaves and barley grains rather than coffee beans are used as a raw material.

The tea and ptisan drinks which were prepared using the pH adjustors of the invention have no saltiness or sliminess but exhibit a good aftertaste, thus presenting excellent aroma and taste, compared to the control which was prepared using sodium bicarbonate.

BEST MODE FOR CARRYING OUT THE INVENTION

Now, this invention will be described more specifically below with reference to examples. It should be noted, however, that this invention is not limited to these examples.

EXAMPLE 1

A liquid extract of Colombia excelso coffee was obtained by decocting 100 g of a roasted and ground coffee (L value 23) with 1000 g of hot water and filtering the decoction. The term "L value" as used herein refers to the value of brightness measured by a calorimeter and represents the degree of roasting in the case of coffee beans. The signification of the L value is such that this value increases with the decreasing degree of roasting and decreases with the increasing degree of roasting.

Then, 500 g of the liquid extract and 40 g of sugar added thereto were stirred until solution and the resultant solution was adjusted to pH 6.8 by addition of an aqueous 0.5M potassium carbonate solution. The resultant prepared solution, after adding 100 g of milk, was diluted with added water to a total quantity of 1 Kg and stirred to obtain a formulated solution. This formulated solution was heated, packed in a can, and sterilized in a retort to produce a canned milk coffee (Y). Separately, a canned milk coffee (X) was produced by following the procedure described above while an aqueous 0.6M sodium bicarbonate solution was used instead of the aqueous potassium carbonate solution to effect the adjustment of pH to 6.8.

The canned milk coffee was stored at room temperature for one week and then subjected to an organoleptic test conducted by a panel of six members.

The organoleptic rating of the drinks was carried out by the following method. The panelists, each given a 100-ml plastic cup holding 50 to 60 ml of the sterilized drinks, were asked first to smell the aroma of the drinks and then keep a sip of the drinks in the mouth and rate the taste. The rating was made by each panelist writing down his comment mainly on the presence or absence of sliminess and saltiness and a good aftertaste. The comments were gathered and summarized.

The results of the test are shown in Table 1.

TABLE 1

| Sample tested | Organoleptic rating |
| --- | --- |
| X | (Aroma) A sweet milky caramellic, slightly heavy odor of milk coffee.<br>(Taste) A mild flavor in milk coffee, exhibited a bad afertaste, and prominent in both sliminess and saltiness. |
| Y | (Aroma) A sweet milky caramellic odor, free from the heavy odor like that of X.<br>(Taste) A flavor of milk coffee exhibited a good aftertaste, free from sliminess and saltiness, with slightly increased bitterness and smooth palatability on the whole. |

EXAMPLE 2

A liquid extract of Colombia excelso coffee was obtained by decocting 1000 g of a roasted and ground coffee (L value 23) with 10000 g of hot water and filtering the decoction. Then, 7000 g of this liquid extract and 560 g of sugar added thereto were stirred until solution and divided by weighing into 15 equal portions each of 500 g.

Figure 1:
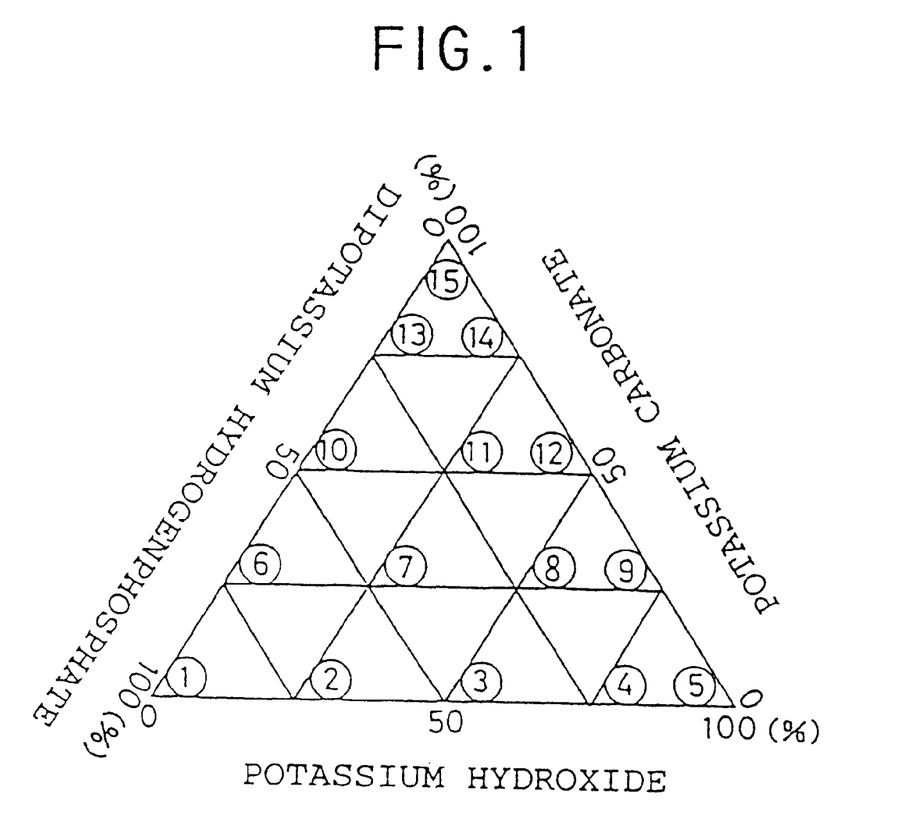
FIG. 1 shows the relative amounts of three kinds of pH adjustors, i.e., aqueous solutions of potassium carbonate, dipotassium hydrogenphosphate and potassium hydroxide.

Then, pH adjusting agents indicated by Nos. 1 through 15 each bearing an open circle as shown in FIG. 1 were prepared by using one member selected or an arbitrary combination of two or three members mixed at a prescribed ratio and selected from the group consisting of three pH adjusting agents, i.e. an aqueous 0.3M potassium carbonate solution, an aqueous 0.2M dipotassium hydrogen phosphate solution, and an aqueous 0.7M potassium hydroxide solution. The portions of sugared coffee extracts were adjusted severally to pH 6.8 by addition of the pH adjusting agents in necessary amounts.

In FIG. 1, Nos. 1 through 15 each bearing an open circle represent the quantitative ratios of relevant pH adjusting agents at the points of concentration manifested by mixing in prescribed quantities the three pH adjusting agents, i.e. an aqueous 0.3M potassium carbonate solution, an aqueous 0.2M dipotassium hydrogen phosphate solution, and an aqueous 0.7M potassium hydroxide solution, used either singly or in the form of a combination of two or three members. No. 11 bearing an open circle, for example, represents a 50:25:25 mixture of the aqueous potassium carbonate solution, the aqueous dipotassium hydrogen phosphate solution, and the aqueous potassium hydroxide solution.

These prepared solutions, after adding 100 g of milk each, were diluted with added water to a total quantity of 1 kg, and stirred to obtain formulated solutions.

The formulated solutions consequently obtained were heated, packed each in a can, and sterilized in a retort to produce 15 species of canned milk coffee. The 15 cans of milk coffee thus produced were stored at room temperature for one week and then subjected to an organoleptic test conducted by a panel of seven members. The method of rating was the same as in Example 1.

Figure 2:
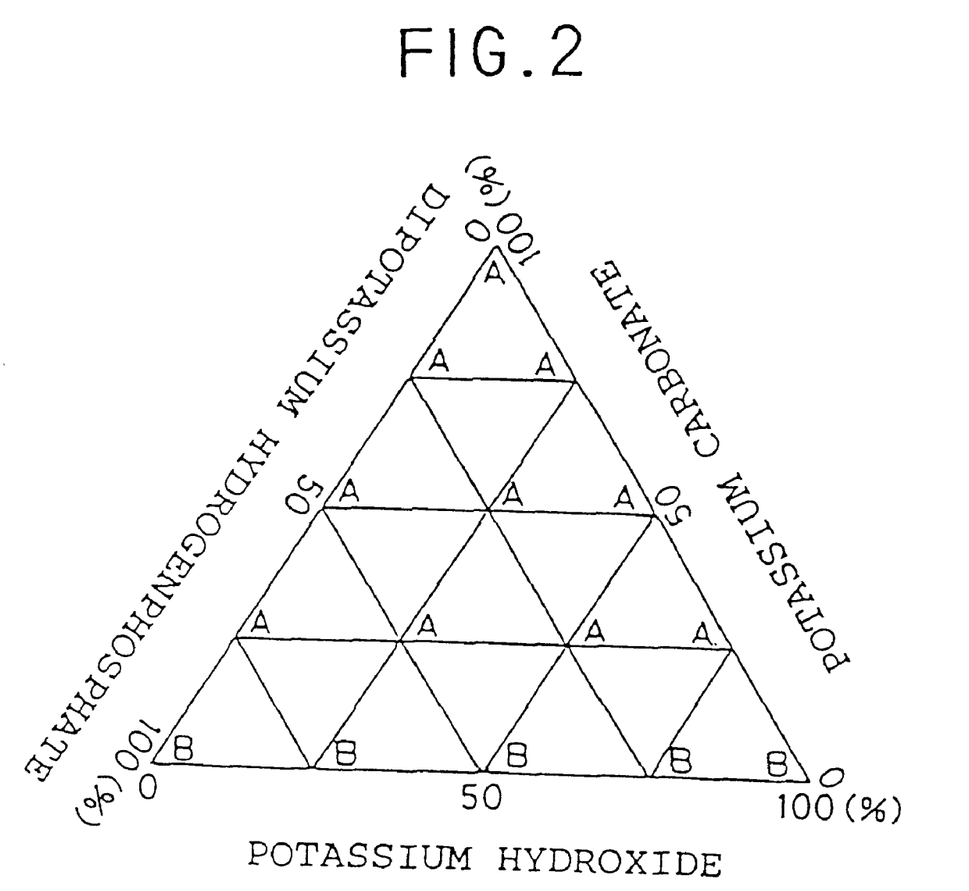
FIG. 2 shows the results of organoleptic tests on samples of canned coffee with milk which were prepared from Colombia coffee and subjected to pH adjustment with pH adjustors at the concentrations shown by Nos. 1–15 each bearing an open circle in FIG. 1.

The results are shown in FIG. 2.

In the diagram, the symbols having the following meanings were used.

A: Free from sliminess and saltiness, exhibited a good aftertaste, devoid of a rough taste and rough feel, and mild.
B: Free from sliminess and saltiness, exhibited a good aftertaste, with slightly increased a rough taste and rough feel.
C. Not free from sliminess and saltiness, exhibited a bad aftertaste, and prominent in the flavor of sodium bicarbonate used for pH adjustment.

EXAMPLE 3

Liquid extracts of species of mocha lekempti coffee having L values of 18 and 22 were obtained by decocting 300 g each of the roasted and ground coffee with 3000 g of hot water and filtering the resultant decoctions. The liquid extracts each 2000 g in quantity, after adding 160 g of sugar each, were stirred until solution and divided by weighing into four equal portions each of 500 g.

Then, pH adjusting agents indicated by Nos. 5, 7, 11, and 15 each bearing an open circle as shown in FIG. 1 were prepared by using one member selected or three members mixed at a prescribed ratio and selected from the group consisting of three pH adjusting agents, i.e. an aqueous 0.3M potassium carbonate solution, an aqueous 0.2M dipotassium hydrogen phosphate solution, and an aqueous 0.7M potassium hydroxide solution. The portions of sugared coffee extracts were adjusted severally to pH 6.8 by addition of the pH adjusting agents in necessary amounts. Separately, the sugared coffee extracts similarly derived from the coffee of L value of 22 were adjusted by addition of an aqueous 0.6M sodium bicarbonate solution to pH 6.8. The resultant prepared solutions, after adding 100 g of milk each, were diluted with added water to a total quantity of 1 kg and stirred to obtain formulated solutions. These formulated solutions were heated, packed each in a can, and sterilized in a retort to produce varying species of canned milk coffee.

These species of canned milk coffee were stored at room temperature for one week and then subjected to an organoleptic test conducted by a panel of five members. The method of rating was the same as in Example 1. The results are shown in Table 2 and FIG. 3.

TABLE 2

| Sample tested | Organoleptic rating |
|---|---|
| a | (Aroma) A sweet milky caramellic, slightly heavy odor of milk coffee. (Taste) A mild flavor in milk coffee, exhibited a bad aftertaste, and prominent in both sliminess and saltiness. |
| b | (Aroma) A sweet milky caramellic odor, free from the heavy odor like that of a. (Taste) A flavor of milk coffee exhibited a good aftertaste and free from sliminess and saltiness, with slightly increased bitterness. |

TABLE 2-continued

| Sample tested | Organoleptic rating |
|---|---|
| c | (Aroma) A sweet milky caramellic odor, free from the heavy odor like that of a. |
| d | |
| e | (Taste) A flavor of milk coffee exhibited a good aftertaste and free fro sliminess and saltiness, more or less prominent in bitterness, smooth to the palate, and devoid of a rough taste on the whole. |

The sample, a, represents the milk coffee (L value 22) obtained by using an aqueous 0.6M sodium bicarbonate solution for pH adjustment, the sample, b, the milk coffee (L values 18 and 22) obtained by using the pH adjusting agent indicated by No. 5 bearing an open circle as shown in FIG. 1, and the samples, c, d, and e, the milk coffee (L values 18 and 22) obtained by using the pH adjusting agents indicated by Nos. 7, 11, and 15 each bearing an open circle.

Figure 3:
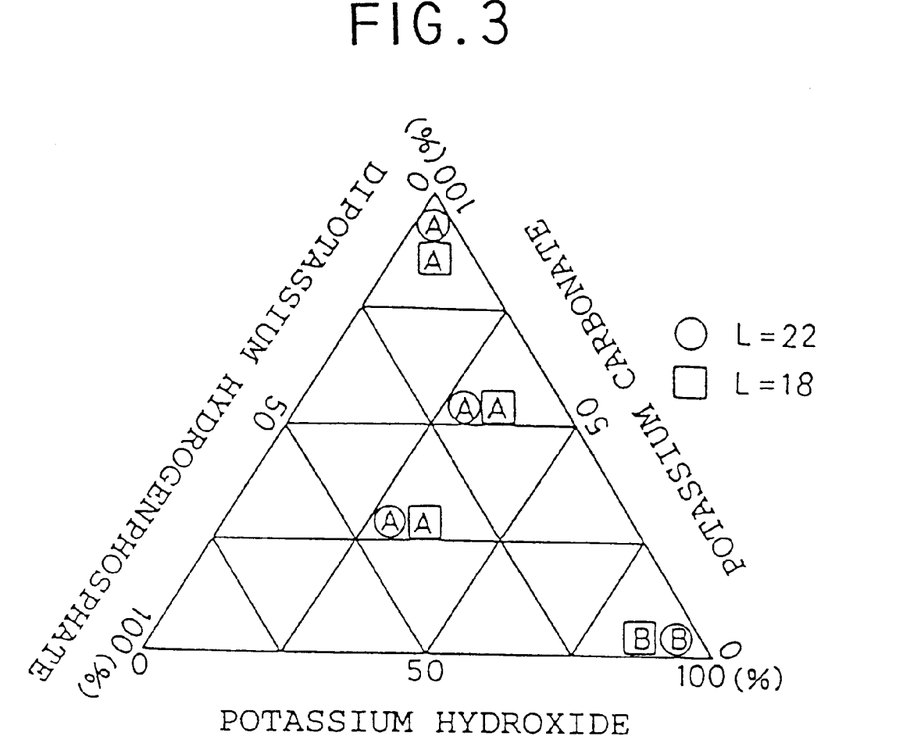
FIG. 3 shows the results of organoleptic tests on samples of canned coffee with milk which were prepared from mocha coffee with different L values and subjected to pH adjustment with pH adjustors at the concentrations shown by Nos. 5, 7, 11 and 15 each bearing an open circle in FIG. 1.

The symbols used in the diagram have the same meanings as defined in Example 2.

EXAMPLE 4

A liquid extract of the blend of 20% by weight of Guatemala antigua coffee having an L value of 20 with 80% by weight of Colombia excelso coffee having an L value of 23 was obtained by decocting 200 g of a roasted and ground coffee with 2000 g of hot water and then filtering the decoction. This liquid extract 1000 g in quantity, after adding 80 g of sugar, was stirred until solution and then divided by weighing into two equal portions, M and N, each of 500 g.

In adding to the N portion the aqueous solution of a pH adjusting agent composed of 71.7% by weight of potassium carbonate, 19.8% by weight of dipotassium hydrogen phosphate, and 8.5% by weight of potassium hydroxide, 70% by volume of the quantity of the aqueous solution required for adjusting the portion to pH 6.8 was added and the balance of an aqueous 0.6M sodium bicarbonate solution was added to attain the adjustment to pH 6.8 aimed at. The portion M was adjusted to pH 6.8 by adding the aqueous 0.6M sodium carbonate solution.

Subsequently, the adjusted solutions of M and N, after adding 100 g of milk each, were diluted with added water to a total quantity of 1 kg and then stirred to obtain formulated solutions.

These formulated solutions were heated, packed each in a can, and sterilized in a retort to produce two species of canned milk coffee. These species of canned milk coffee were stored at room temperature for one week and then subjected to an organoleptic test conducted by a panel of seven members. The rating method was the same as in Example 1.

The results are shown in Table 3.

TABLE 3

| Sample tested | Organoleptic rating |
|---|---|
| M | (Aroma) A sweet milky caramellic, slightly heavy odor of milk coffee. (Taste) A mild flavor in milk coffee, exhibited a bad aftertaste, and prominent in both sliminess and saltiness. |
| N | (Aroma) A sweet milky caramellic odor, free from the heavy |

TABLE 3-continued

| Sample tested | Organoleptic rating |
|---|---|
| | odor like that of M.<br>(Taste) A flavor of milk coffee exhibited a good aftertaste and free from sliminess and saltiness, with slightly increased bitterness and smooth palatability on the whole. |

The sample, M, represents the milk coffee obtained by using the aqueous 0.6M sodium bicarbonate solution for pH adjustment and the sample, N, represents the milk coffee obtained by using the aqueous solution of the mixture of potassium carbonate, dipotassium hydrogen phosphate, and potassium hydroxide and the aqueous sodium bicarbonate solution for pH adjustment.

EXAMPLE 5

A liquid extract was obtained by decocting 50 g of Assam black tea leaves with 2000 g of hot water and then filtering the decoction. This liquid extract 1200 g in quantity, after adding 200 g of sugar, was stirred until solution and then divided by weighing into three equal portions each of 400 g.

Then, pH adjusting agents indicated by Nos. 7, 10, and 15 each bearing an open circle as shown in FIG. 1 were prepared by using one member selected or two or three members mixed at a prescribed ratio and selected from the group consisting of three pH adjusting agents, i.e. an aqueous 0.3M potassium carbonate solution, an aqueous 0.2M dipotassium hydrogen phosphate solution, and an aqueous 0.7M potassium hydroxide solution. The portions of liquid extract of Assam black tea were adjusted severally to pH 6.8 by addition of the pH adjusting agents in necessary amount.

The adjusted solutions, after adding 100 g of milk each, were diluted with added water to a total quantity of 1 kg and then stirred to produce formulated solutions. The formulated solutions were heated, packed each in a can, and then sterilized in a retort to produce varying species of canned milk tea. Separately, a canned milk tea was produced by following the procedure mentioned above while using an aqueous 0.6M sodium bicarbonate solution in the place of the pH adjusting agents indicated by Nos. 7, 10, and 15 each bearing an open circle as shown in FIG. 1 to effect the pH adjustment to 6.8. This canned milk tea was stored at room temperature for one week and then subjected to an organoleptic test conducted by a panel of eight members. The rating method was the same as in Example 1. The results are shown in Table 4 and FIG. 4.

TABLE 4

| Sample tested | Organoleptic rating |
|---|---|
| i | (Aroma) A sweet, slightly heavy odor of milk tea.<br>(Taste) A mild and heavy flavor in milk tea, prominent in both sliminess and saltiness. |
| ro<br>ha<br>ni | (Aroma) Sweet and devoid of the heavy odor like that of i.<br>(Taste) A refreshing flavor inherent in milk tea, devoid of sliminess and saltiness, and smooth to the palate on the whole. |

Figure 4:
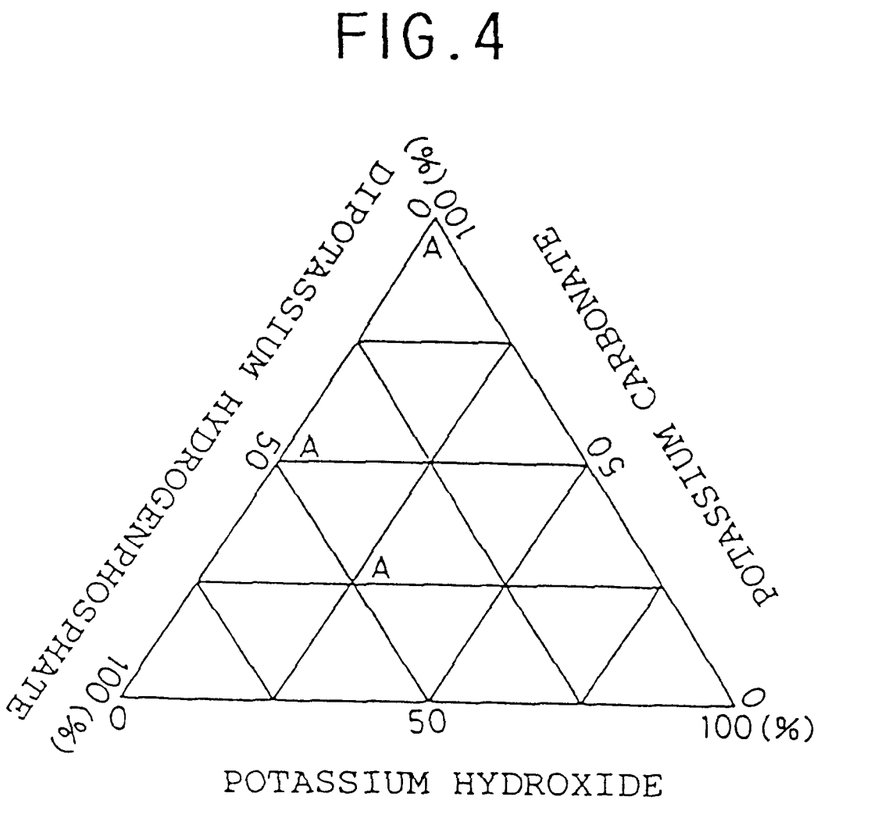
FIG. 4 shows the results of organoleptic tests on samples of canned tea with milk which were prepared from Assam tea and subjected to pH adjustment with pH adjustors at the concentrations shown by Nos. 7, 10 and 15 each bearing an open circle in FIG. 1.

The sample, i, represents the milk tea obtained by using the aqueous 0.6M sodium bicarbonate solution for pH adjustment, the samples, ro, ha, and ni, represent the species of milk tea obtained by respectively using the pH adjusting agents indicated by Nos. 7, 10, and 15 each bearing an open circle as shown in FIG. 1 for pH adjustment. The symbols used in the diagram are the same as in Example 2.

EXAMPLE 6

A liquid extract of Rokujo barley was obtained by decocting 100 g of roasted barley grains with 1800 g of hot water and filtering the decoction. This liquid extract, after adding 0.5 g of L-ascorbic acid, was divided by weighing into two equal portions each of 500 g. Then, pH adjusting agents indicated by Nos. 11 and 15 each bearing an open circle as shown in FIG. 1 were prepared by using one member selected or three members mixed at a prescribed ratio and selected from the group consisting of three pH adjusting agents, i.e. an aqueous 0.3M potassium carbonate solution, an aqueous 0.2M dipotassium hydrogen phosphate solution, and an aqueous 0.7M potassium hydroxide solution. The portions of the extract of roasted Rokujo barley grains were adjusted severally to pH 6.3 by addition of the pH adjusting agents in necessary amounts.

The adjusted solutions were diluted with added water each to a total quantity of 1 kg and stirred to produce formulated solution. These formulated solutions were heated, packed each in a can, and sterilized in a retort to produce varying species of canned ptisan. Separately, a canned ptisan was produced by following the procedure described above while using an aqueous 0.6M sodium bicarbonate solution in the place of the pH adjusting agents indicated by Nos. 11 and 15 each bearing an open circle as shown in FIG. 1. The varying species of canned ptisan produced as described above were stored at room temperature for one week and then subjected to an organoleptic test conducted by a panel of five members. The rating method was the same as in Example 1.

Figure 5:
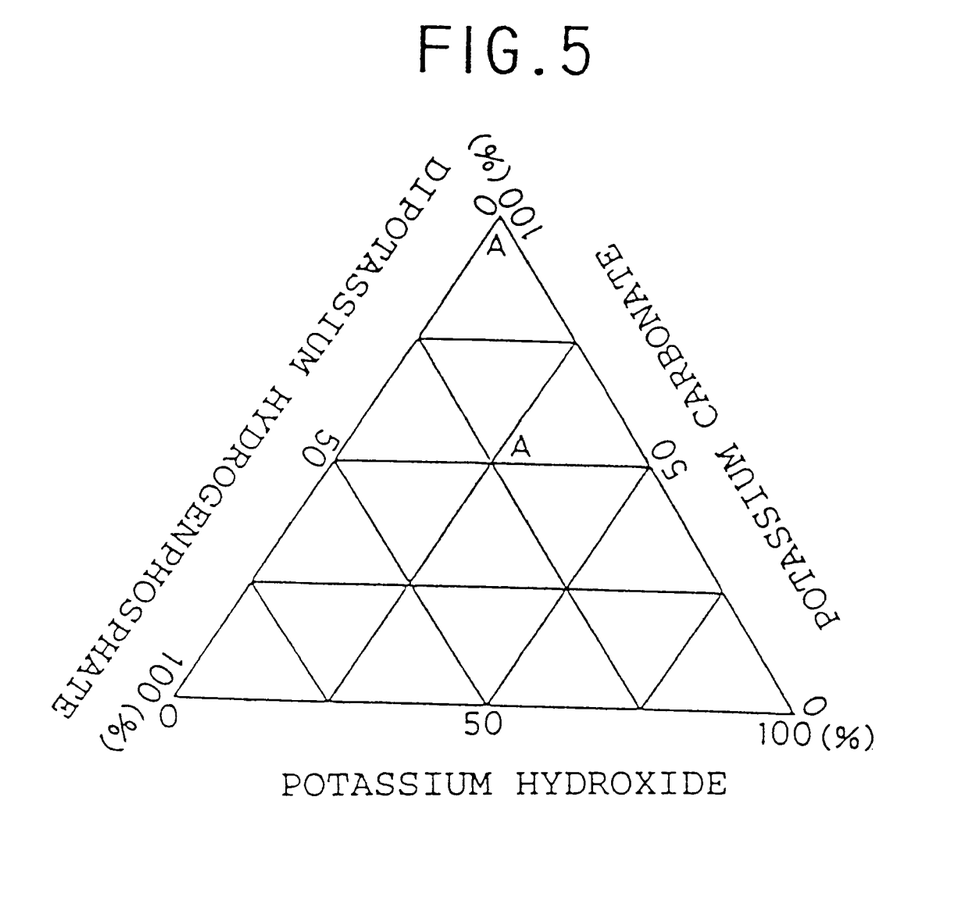
FIG. 5 shows the results of organoleptic tests on samples of canned ptisan which were prepared from roasted Rokujo barley and subjected to pH adjustment with pH adjustors at the concentration shown by Nos. 11 and 15 each bearing an open circle in FIG. 1.

The results are shown in Table 5 and FIG. 5.

TABLE 5

| Sample tested | Organoleptic rating |
|---|---|
| I | (Aroma) A fragrant, roasty, and wild odor, devoid of body.<br>(Taste) A fragrant flavor slightly deficient in body, with lasting bitter and confuse aftertaste. |
| II | (Aroma) Both a fragrant, pleasing, and mild odor, with body. |
| III | (Taste) A pleasingly bitter and a good aftertaste, with slightly acidity and a mild emission of the taste of ptisan. |

The sample, I, represents the ptisan obtained by using the aqueous 0.6M sodium bicarbonate solution for pH adjustment and the samples, II and III, represent the species of ptisan obtained by respectively using the pH adjusting agents indicated by Nos. 11 and 15 each bearing an open circle as shown in FIG. 1. The symbols used in the diagram are the same as in Example 2.

EXAMPLE 7

A liquid extract of Colombia excelso coffee was obtained by decocting 200 g of a roasted ground coffee (L value 23) with 2000 g of hot water and filtering the decoction. This liquid extract 1000 g in quality, after adding 80 g of sugar, was stirred until solution and then divided by weighing into two portions, α and β, each of 500 g.

Then, the portion, β, added an aqueous 0.1M tripotassium phosphate solution in an amount necessary for adjustment to pH 6.8. Meanwhile, the portion, α, was adjusted to pH 6.8 by the addition of an aqueous 0.6M sodium bicarbonate solution.

These adjusted solutions, after adding 100 g of milk, were diluted with added water each to a total quantity of 1 kg and then stirred to produce formulated solutions. These formulated solutions were heated, packed each in a can, and sterilized in a retort to produce two species of canned milk coffee. The species of canned milk coffee were stored at room temperature for one week and then subjected to an organoleptic test conducted by a panel of five members. The rating method was the same as in Example 1. The results are shown in Table 6.

TABLE 6

| Sample tested | Organoleptic rating |
|---|---|
| α | (Aroma) A sweet, milky, caramellic, heavy odor. (Taste) A mild flavor accompanied by sliminess and saltiness, exhibited a bad aftertaste. |
| β | (Aroma) A roasty bitter odor of milk coffee. (Taste) A roasty bitter flavor of milk coffee, devoid of the taste of sodium bicarbonate. |

The sample, α, represents the milk coffee obtained by using the aqueous 0.6M sodium bicarbonate solution and the sample, β, represents the milk coffee obtained by using the aqueous 0.1M tripotassium phosphate solution for pH adjustment.

EXAMPLE 8

A liquid extract of Colombia excelso coffee was obtained by decocting 300 g of a roasted ground coffee (L value 23) with 3000 g of hot water and filtering the decoction. This liquid extract 2000 g in quantity, after adding 160 g of sugar, was stirred until solution and divided by weighing into four equal portions each of 500 g.

Then, four pH adjusting agents were prepared by mixing an aqueous 0.6M sodium bicarbonate solution and an aqueous 0.2M potassium carbonate solution at four ratios, 100:0, 75:25, 50:50, and 25:75. The four portions of the sugared coffee extract were adjusted to pH 6.8 by the addition of the pH adjusting agents in proper amounts.

The adjusted solutions, after adding 100 g of milk each, were diluted with added water each to a total quantity of 1 kg and then stirred to produce formulated solutions.

The formulated solutions were heated, packed each in a can, and sterilized in a retort to produce four species of canned milk coffee. The four species of canned milk coffee were stored at room temperature for one week and then subjected to an organoleptic test conducted by a panel of five members. The rating method was the same as in Example 1.

The results are shown in Table 7.

TABLE 7

| Sample tested | Organoleptic rating |
|---|---|
| (1) | (Aroma) A roasty, caramellic, and milky odor. (Taste) A sweet and bitter flavor, with little rough taste and prominent saltiness and sliminess. |
| (2) | (Aroma) A roasty, caramellic, and milky odor. (Taste) A bitter and rough taste, with slight saltiness and sliminess. |
| (3) | (Aroma) A bitter, roasty, and milky odor. (Taste) A flavor practically equal to that of (2) and inferior in saltiness and sliminess to (2). |

TABLE 7-continued

| Sample tested | Organoleptic rating |
|---|---|
| (4) | (Aroma) A light, soft, and sweet smell (Taste) A strongly bitter flavor and a mild emission of coffee flavor, devoid of saltiness and sliminess. |

The sample, (1), represents the milk coffee obtained by using the pH adjusting agent having the aqueous 0.6M sodium bicarbonate solution and the aqueous 0.2M potassium carbonate solution at a ratio of 100:0, the sample, (2) the milk coffee obtained by using the pH adjusting agent having the two aqueous solutions at a ratio of 75:25, the sample, (3) the milk coffee obtained by using the pH adjusting agent having the two aqueous solutions at a ratio of 50:50, and the sample, (4), the milk coffee obtained by using the pH adjusting agent having the two aqueous solutions at a ratio of 25:75, respectively for pH adjustment.

Industrial Applicability

According to the present invention, pH adjustors having the following advantageous effects are provided.

1. The pH adjustors of the present invention can improve the aroma and taste of drinks and maintain the improved aroma and taste. These effects cannot be produced by the conventionally used pH adjustors represented by sodium bicarbonate.

2. The pH adjustors of the present invention can improve very remarkably the aroma and taste of coffee drinks and maintain the improved aroma and taste in the case where potassium carbonate, dipotassium hydrogenphosphate or potassium hydroxide is selected as an active ingredient from potassium salts.

3. The pH adjustors of the present invention, even if being used in combination with sodium bicarbonate, can improve the aroma and taste of drinks and maintain the improved aroma and taste.

4. The pH adjustors of the present invention can also improve the aroma and taste of tea and ptisan drinks and maintain the improved aroma and taste.

We claim:

1. A drink which comprises a pH adjustor consisting essentially of a potassium salt as an active ingredient, wherein said potassium salt comprises an effective amount for adjusting pH of at least one member selected from the group consisting of potassium carbonate, dipotassium hydrogenphosphate and potassium hydroxide, wherein the pH adjustor is capable of suppressing the deterioration of aroma, taste or both aroma and taste due to lowering of pH by retort sterilization.

2. The drink of claim 1, wherein the composition ratio of said potassium salts is in the range of 10–100% by weight of potassium carbonate and 90–0% by weight of dipotassium hydrogenphosphate, potassium hydroxide or both dipotassium hydrogenphosphate and potassium hydroxide.

3. The drink of claim 2, further comprising an aqueous flavored solution which is prepared from a plant extract.

4. The drink of claim 3, wherein said aqueous flavored solution is a coffee drink.

5. The drink according to claim 3, wherein said aqueous flavored solution is tea or ptisan.

6. A method for adjusting the pH of drinks consisting essentially of contacting an aqueous flavored solution with a pH adjustor comprising a potassium salt as an active ingredient, wherein said potassium salt comprises an effective amount for adjusting pH of at least one member selected from the group consisting of potassium carbonate, dipotassium hydrogenphosphate and potassium hydroxide, wherein the pH adjustor is capable of suppressing the deterioration of aroma, taste or both aroma and taste due to lowering of pH by retort sterilization.

7. The method according to claim 6, wherein said drink is a coffee drink.

8. The method according to claim 6, wherein the composition ratio of said potassium salts is in the range of 10–100% by weight of potassium carbonate and 90–0% by weight of dipotassium hydrogenphosphate, potassium hydroxide or both dipotassium hydrogenphosphate and potassium hydroxide.

9. The method according to claim 6, wherein the aqueous flavored solution is a drink which is prepared from a plant extract.

10. A drink comprising water, liquid extract of coffee or tea leaves, milk, and a pH adjustor consisting essentially of a potassium salt as an active ingredient, wherein said potassium salt comprises an effective amount for adjusting pH of at least one member selected from the group consisting of potassium carbonate, dipotassium hydrogenphosphate and potassium hydroxide, wherein the pH adjustor is capable of suppressing the deterioration of aroma, taste or both aroma and taste due to lowering of pH by retort sterilization.

11. A drink comprising water, liquid extract of coffee, tea leaves or barley, and a pH adjustor consisting essentially of a potassium salt as an active ingredient, wherein said potassium salt comprises an effective amount for adjusting pH of at least one member selected from the group consisting of potassium carbonate, dipotassium hydrogenphosphate and potassium hydroxide, wherein the pH adjustor is capable of suppressing the deterioration of aroma, taste or both aroma and taste due to lowering of pH by retort sterilization.

* * * * *